No. 867,094. PATENTED SEPT. 24, 1907.
H. C. BEMAN.
DISPENSING APPARATUS.
APPLICATION FILED NOV. 19, 1906.
2 SHEETS—SHEET 1.
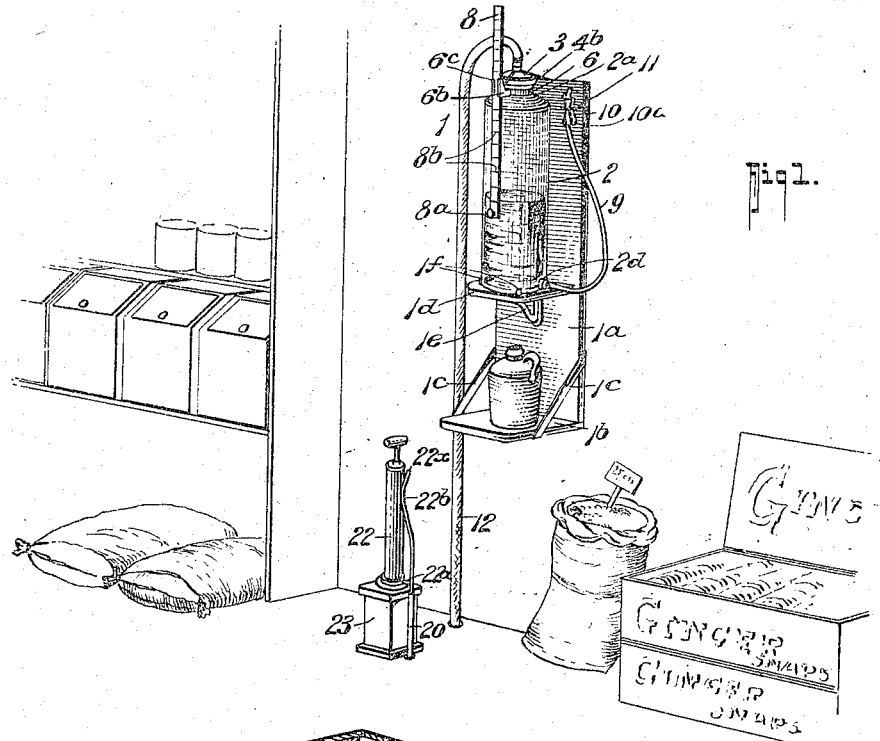
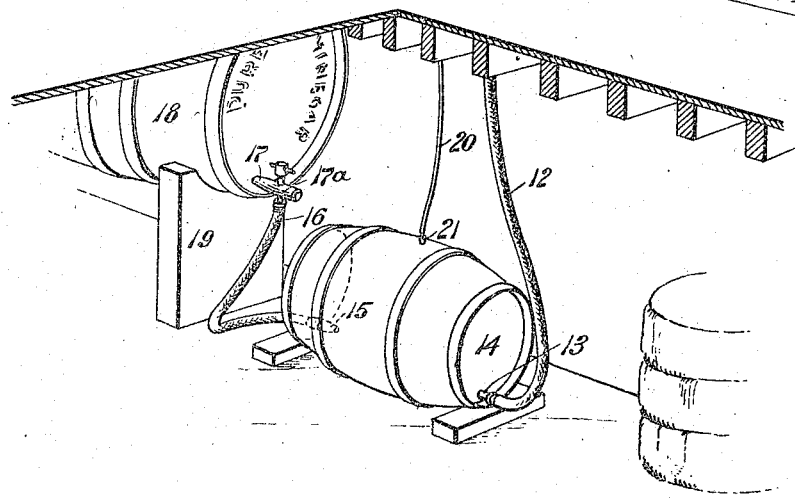
WITNESSES:
John T. Schrott
F. C. Gibson.
INVENTOR
Henry C. Beman.
BY
Fred G. Dieterich
ATTORNEYS

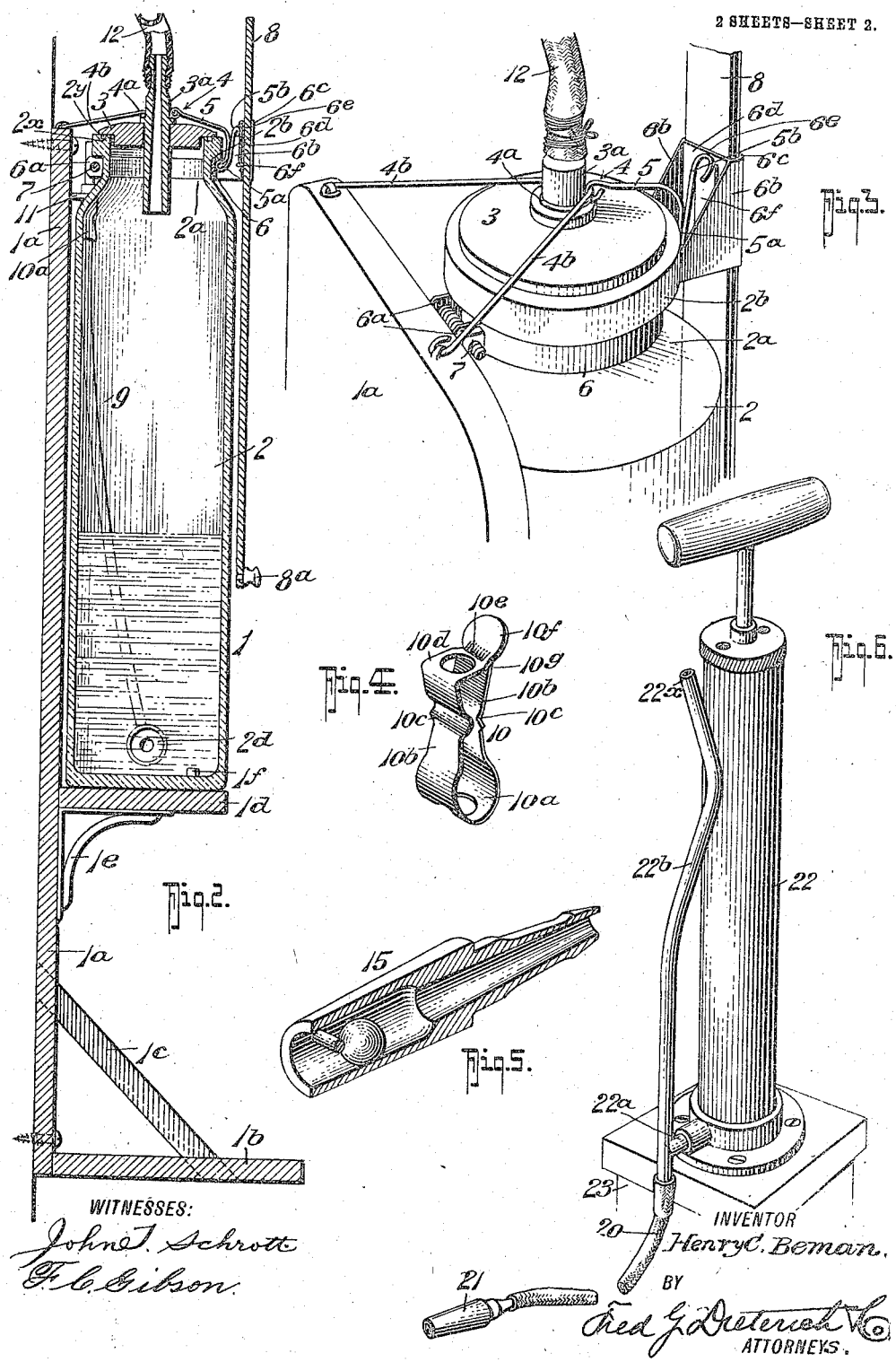

UNITED STATES PATENT OFFICE.

HENRY CLAY BEMAN, OF MEADVILLE, PENNSYLVANIA.

DISPENSING APPARATUS.

No. 867,094.  Specification of Letters Patent.  Patented Sept. 24, 1907.

Application filed November 19, 1906. Serial No. 344,139.

*To all whom it may concern:*

Be it known that I, HENRY C. BEMAN, residing at Meadville, in the county of Crawford and State of Pennsylvania, have invented certain new and useful Improvements in Dispensing Apparatus, of which the following is a specification.

My present invention relates to certain new and useful improvements in apparatus for dispensing liquids and it is particularly adapted for use in dispensing vinegar and the like.

Primarily my invention has for its object to provide a device of this character which has provisions in virtue of which it measures the quantity of liquid dispensed and the dispensing of the liquid is always under control of the operator.

In its generic nature, my invention comprises a cabinet adapted to be secured upon a suitable support into which the liquid is adapted to be pumped from a reservoir that is in communication with a barrel or other suitable liquid container, means for pumping the liquid into the cabinet, means carried by the cabinet for indicating the quantity of liquid it is desired to withdraw and means whereby the liquid can be withdrawn from the cabinet to the desired quantity.

In its more detailed nature my invention involves certain novel construction, operation and combination of parts, all of which will be first described in detail and then be specifically pointed out in the appended claims, reference being had to the accompanying drawings, in which:—

Figure 1, is a perspective view of my invention applied for use. Fig. 2, is a central vertical longitudinal section of the dispensing cabinet. Fig. 3, is a detail perspective view on an enlarged scale of the upper end of the cabinet showing the manner of holding the scale. Fig. 4, is a detail perspective view of the cut-off clamp for the delivery tube upon the cabinet. Fig. 5, is a detail perspective view of the back check valve for the reservoir. Fig. 6, is a detail perspective view of the pump and its stand.

Referring now to the accompanying drawings in which like letters and numerals of reference indicate like parts in all of the figures, 1 designates the dispensing cabinet which consists of a supporting stand $1^a$ having a base $1^b$ supported by brackets $1^c$ and adapted to receive the vessel to be filled. Above the base $1^b$ and spaced a suitable distance therefrom is a platform $1^d$ supported by a bracket $1^e$ upon which the dispensing and measuring vessel 2 rests. The vessel 2 is held from movement on the platform $1^d$ by lugs $1^f$, as shown. The vessel 2 in my present invention is preferably in the nature of a glass jar having a wide neck $2^a$ adapted to be closed by a top 3, through which a nipple $3^a$ projects. The top 3 is held in place on the jar by means of a spring locking member 4 which includes a loop $4^a$ for encircling the nipple $3^a$ and has its ends $4^b$ pivotally connected to the top of the base-board $1^a$.

5 designates a hook member secured to the member 4 which has a hook portion $5^a$ adapted to hook under the flange $2^b$ of the jar neck $2^a$ and provided further with a finger engaging portion $5^b$, by means of which the spring can be released from the bottle neck when desired.

6 designates a clamp preferably formed of sheet metal which encircles the jar neck $2^a$ and is secured in place by means of a bolt and nut 7, the bolt passing through ears $6^a$ in the collar 6.

The collar 6 is provided with a pair of outwardly projecting gage carrying members $6^b$ whose outer ends are turned over parallel with one another as at $6^e$ and a plate $6^d$ is secured to the members $6^b$ at a slight distance from the parallel portion $6^e$. This forms a gage receiving passage-way $6^e$ to receive the sliding gage 8, and to hold the gage 8 in its adjusted position I provide a spring member $6^f$ that is secured to the plate $6^d$ and projects through the aperture therein to engage the gage 8 and hold it against the parallel portion $6^e$ of the gage holder. The gage 8 is in the nature of a flat rod provided with a finger engaging button $8^a$, and suitably spaced and indicated graduations $8^b$, as shown and for a purpose presently explained.

The vessel or jar 2, at its lower end is provided with an off-take nipple $2^d$, to which the flexible off-take pipe 9 is secured, the free end of the pipe 9 being provided with a cut-off clamp 10, as shown. The clamp 10 may be of any approved construction, but I prefer to make the same of springy sheet metal and consisting of a U-shaped spring portion $10^a$, a pair of arms $10^b$, provided with transverse ribs $10^c$, one of the arms $10^b$ having a portion $10^d$ projected at right angles to the main portion thereof, and having a catch part $10^e$ and a finger engaging portion $10^f$ as shown, the catch portion $10^e$ coöperating with the end $10^g$ of the other arm $10^b$, as shown. The U-shaped spring member $10^a$ is provided with an aperture as is also the member $10^d$ to permit passage of the flexible pipe 9, as indicated.

11 designates a holder secured to the base $1^a$ at a point near the top thereof, which is adapted to receive the pipe 9 and hold the same with its free end at a point above the top of the vessel 2.

12 designates the conveying pipe or hose which has its upper end connected to the nipple $3^a$ of the closure top 3 and its lower end connected with the plug 13 in an aperture of a reservoir 14, as indicated. The reservoir 14 may be in the nature of a keg or other suitable receptacle.

15 designates a back check valve in communication with the interior of the reservoir 14 to which a flexible pipe 16 is connected. The pipe 16 has its other end connected with a cock $17^a$ of an off-take spigot 17 of the main reservoir or receptacle from which the liquid to be dispensed is initially drawn. This receptacle 18 may be in the nature of an ordinary vinegar barrel. In practice, the barrel or main receptacle 18 is elevated above the reservoir 14 by suitable supports 19, as indicated.

20 designates an air pipe one end of which is connected through a nipple 21 with the top of the reservoir 14, so as to be in communication therewith, while the other end of the air pipe 20 is in communication with the discharge pipe 22ᵃ of an air pump 22 which pump is provided with a vent tube 22ᵇ in communication with the discharge pipe 22ᵃ and passed up along the barrel of the pump 22, to a point adjacent the top of the pump thereof, the vent tube having its upper end 22ˣ open as shown, so that free access of air through the vent tube and pipe 20 may be had to the reservoir under normal conditions.

In order to insure a tight joint between the top 3 and the jar or vessel 2, I provide the upper end of the neck 2ᵃ of the vessel 2 with a seat 2ˣ Fig. 2 to receive a rubber gasket 2ʸ, if desired.

In setting up my improved apparatus for use the supporting stand 1ᵃ is secured in the desired place on a wall, ledge or counter, as may be most convenient for use. The sliding gage is then inserted into its holder through the bottom of the same and secured up into position.

The pump 22 is provided with a pedestal 23 which may be secured to the floor and the pump secured on the top of the pedestal so as to make it more convenient for operation. The hose or pipe 12 is then connected to the nipple 3ᵃ of the top 3 and passed through the aperture in the floor and connected with the reservoir 14, as before stated. The pipe or hose 20 is connected with the pump 22 and the reservoir, as before stated, being passed through the floor of the room. The main reservoir 18 is then connected with the reservoir 14, as before stated. After the connections have all been made and it is desired to initially fill the dispensing vessel or jar 2, the operator opens the cock 17ᵃ of the spigot 17, thus allowing the reservoir 14 to fill by gravity, the liquid passing from the main reservoir 18 into the reservoir 14 through the back check valve 15 and hose connection 16 hereinbefore referred to. The operator then closes the open end of the vent tube 22ᵇ with his thumb or finger and operates the pump 22. This forces the air into the reservoir 14 and in consequence thereof displaces the liquid of the reservoir 14 and forces it up through pipe or hose 12 into the vessel 2 through the top thereof. When the vessel 2 is nearly filled the operator operates the pump 22 slowly and when the liquid reaches the neck of the jar the pumping operation is stopped and the finger removed from the vent tube to open the same. As soon as the vent tube has been open, the liquid within the pipe 12 will siphon back to its normal level in the reservoir 14, and at the same time the liquid will run from the reservoir 18 into the reservoir 14 to replace that pumped into the vessel 2. Now in order to dispense the liquid from the vessel 2 in definite quantities, the operator moves the gage member to a point where the indicated quantity, on the scale, to be drawn, is exactly on a level with the surface of the liquid within the jar or vessel 2. The operator then inserts the free end of the off-take hose 9 into the jug or other receptacle into which it is desired to dispense a given quantity of the liquid and releases the clamp 10, letting the liquid run out until it is drawn off down to the extreme lower end of the gage. As soon as the level of the liquid within the vessel 2 reaches a point in alinement with the lower end of the gage 8, the hose 9 is quickly closed and replaced in its holder, thus the desired quantity of liquid is dispensed into the receptacle. In order to enable an accurate dispensation to be made, the stream as it passes from the pipe 9 may be reduced in size when nearly all the liquid desired has been withdrawn by slightly pressing upon the clamp 10. To dispense any quantity of liquid from the jar or vessel 2 it is only necessary to again draw the gage down and set the same with the indicated mark on a level with the top of the liquid and draw off the desired quantity, as before. When the vessel 2 is nearly empty it may be recharged as at first.

This invention is particularly adapted for dispensing vinegar and the like and when liquids such as vinegar are used the pipes or hose connections 9, 12, 16 and 20 are preferably made acid proof.

From the foregoing description taken in connection with the accompanying drawings it is thought the complete construction, operation and many advantages of my invention will be readily understood and I desire to call attention to the fact that if the main reservoir 18 is to be held at a place on the same floor as the pump 22, it will be then necessary to lift the pipe 20 to a point above the top of the reservoir 18 so as to prevent the liquid running into the pump as will be readily understood by those skilled in the art.

What I claim is:—

1. In an apparatus of the class described, a measuring and dispensing cabinet comprising a supporting frame, a measuring vessel mounted thereon, a removable top for said measuring vessel, said top having a nipple, said measuring vessel having an outlet at its bottom, a siphon tube connecting with said outlet, a pinch cock for closing said siphon tube, a gage carried by the measuring vessel, a main supply reservoir, a supplemental reservoir, valved pipe connections between the main and the supplemental reservoir, a back check valve in said valved pipe connections, said supplemental reservoir adapted to be filled from said main reservoir by gravity, a flexible pipe connection from said supplemental reservoir to the nippled top of the measuring vessel, and means for forcing air into the supplemental reservoir to fill the measuring vessel, substantially as shown and described.

2. In an apparatus of the class described, a measuring and dispensing cabinet comprising a supporting frame, a measuring vessel mounted thereon, a removable top for said measuring vessel, said top having a nipple, said measuring vessel having an outlet at its bottom, a siphon tube connecting with said outlet, a pinch cock for closing said siphon tube, a gage carried by the measuring vessel, a main supply reservoir, a supplemental reservoir, valved pipe connections between the main and the supplemental reservoir, a back check valve in said valved pipe connections, said supplemental reservoir adapted to be filled from said main reservoir by gravity, a flexible pipe connection from said supplemental reservoir to the nippled top of the measuring vessel, and means for forcing air into the supplemental reservoir to fill the measuring vessel, said last named means comprising a pump, pipe connections between the pump and the supplemental reservoir, and a vent tube carried by the pump, substantially as shown and described.

HENRY CLAY BEMAN.

Witnesses:
F. F. LIPPITT,
J. V. BRUNETT.